S. McC. HAMILTON.
Harness-Buckle.

No. 206,561.  Patented July 30, 1878.

WITNESSES:  
W. W. Hollingsworth  
S. P. Kernon

INVENTOR:  
S. McC. Hamilton  
BY  
ATTORNEYS.

UNITED STATES PATENT OFFICE.

SAMUEL McCLEARY HAMILTON, OF FORT SMITH, ARKANSAS.

IMPROVEMENT IN HARNESS-BUCKLES.

Specification forming part of Letters Patent No. 206,561, dated July 30, 1878; application filed June 18, 1878.

*To all whom it may concern:*

Be it known that I, SAMUEL McC. HAMILTON, of Fort Smith, in the county of Sebastian and State of Arkansas, have invented a new and Improved Harness-Buckle; and I do hereby declare that the following is a full, clear, and exact description of the same.

The invention relates to an improvement in the class of buckles adapted for attachment to the back-band of plow-harness and performing the function of trace-carriers. Heretofore the hooks of such back-band buckles have been constructed in one piece with the straight or flat frame thereof.

My improvement consists in providing the buckle-frame with stops or shoulders, which limit the movement, and thereby prevents detachment of the sliding toothed bar constituting the tongue; and in making the hook separate from the frame and hinging them together, whereby the buckle is less liable to chafe the draft animal, and whereby certain other advantages are attained.

Figure 1:
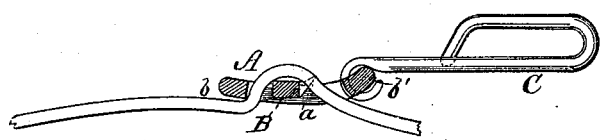
Figure 2:
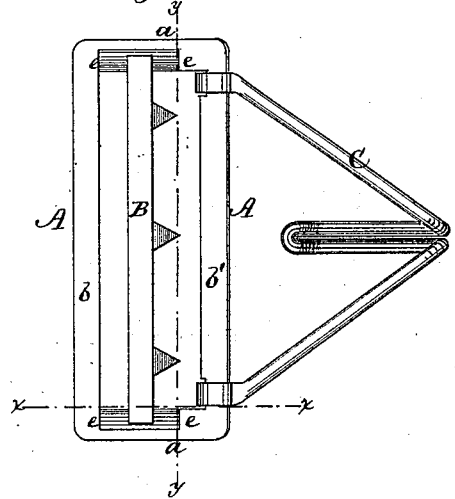
Figure 3:
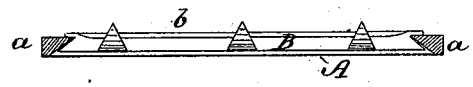

In the accompanying drawing, forming part of this specification, Figure 1 is a cross-section on line $x\ x$ of Fig. 2, showing the buckle applied to a piece of webbing. Fig. 2 is a bottom-plan view of the buckle. Fig. 3 is a lengthwise section on line $y\ y$ of Fig. 2.

The frame A of the buckle proper is oblong and rectangular in form. The end bars $a\ a$ are slightly curved upward, as shown in Fig. 1, and beveled on the inner side, to adapt them for attachment of the central tongue or toothed bar B, whose ends are notched to fit the beveled portion of bars $a\ a$. The said bar B is constructed of wrought or malleable iron, and applied to the frame A, when either the latter or the bar is heated sufficiently to have the requisite flexibility. It is adjustable between the side bars $b\ b'$ of frame A; but in order to prevent its accidental detachment and loss, the end bars $a\ a$ are provided with stops or shoulders $e\ e$, Fig. 2, which limit its movement, as will be readily understood. The sliding bar presses the webbing against the side bar $b$, so that the latter is held by friction, in part, and is hence less liable to be torn by the teeth.

The hook C is constructed of wrought-iron and hinged to one of the side bars $b'$ of frame A, in place of being made in one rigid piece with said frame, as heretofore.

I have found by practical use that, aside from the wrought-metal hook being stronger and more durable than one made of cast metal, it is far less liable to chafe or injure the draft-animal's skin when the trace-chains are attached, since, being hinged, it allows the chains to swing free below it. The flexible connection also facilitates attachment and detachment of the chains.

What I claim is—

1. The combination of the toothed wrought-metal tongue or bar B, having notched ends, with the frame A, having end bars provided with shoulders for limiting the adjustment of said bar and preventing its detachment, as specified.

2. The back-band buckle formed of the rectangular frame A, having sliding toothed tongue B and the hook C, hinged thereto, as shown and described.

SAMUEL McCLEARY HAMILTON.

Witnesses:
D. B. SPARKS,
LEWIS CORING.